US012592506B2

(12) United States Patent
Chvala

(10) Patent No.: US 12,592,506 B2
(45) Date of Patent: Mar. 31, 2026

(54) ELECTRICAL CONNECTOR ASSEMBLY WITH SNAP LOCKING FEATURES

(71) Applicant: Carlisle Interconnect Technologies, Inc., St. Augustine, FL (US)

(72) Inventor: Joseph W. Chvala, St. Augustine, FL (US)

(73) Assignee: Amphenol Cable and Interconnect Technologies, Inc., St. Augustine, FL (US)

( * ) Notice: Subject to any disclaimer, the term of this patent is extended or adjusted under 35 U.S.C. 154(b) by 370 days.

(21) Appl. No.: 18/299,429

(22) Filed: Apr. 12, 2023

(65) Prior Publication Data

US 2024/0347947 A1 Oct. 17, 2024

(51) Int. Cl.
*H01R 13/11* (2006.01)
*H01R 13/629* (2006.01)
*H01R 13/639* (2006.01)

(52) U.S. Cl.
CPC ......... *H01R 13/111* (2013.01); *H01R 13/629* (2013.01); *H01R 13/639* (2013.01)

(58) Field of Classification Search
CPC .... H01R 13/639; H01R 13/629; H01R 13/111
USPC .......................................................... 439/851
See application file for complete search history.

(56) References Cited

U.S. PATENT DOCUMENTS 2,540,012 A 1/1951 Salati et al.
2,984,811 A 5/1961 Hennessey et al.
3,182,280 A 5/1965 Daut et al.
3,275,970 A 9/1966 Bengt et al.
3,416,125 A 12/1968 Theve
3,594,694 A 7/1971 Clark
4,542,952 A 9/1985 Tomsa
(Continued)

FOREIGN PATENT DOCUMENTS

FR 2462797 A1 2/1981

OTHER PUBLICATIONS

Gomes Sirenkov E M., International Search Report, Jun. 20, 2024, 3 pages.

*Primary Examiner* — Tulsidas C Patel
*Assistant Examiner* — Thaslimur Rahman
(74) *Attorney, Agent, or Firm* — Wood Herron & Evans LLP

(57) ABSTRACT

An electrical connector assembly for use with conductors includes a pin assembly with a pin and a socket assembly to mate with the pin assembly. The socket assembly includes a socket body configured to receive the pin. A finger collar surrounds the socket body, and a locking collar surrounds and is rotatable on the finger collar. The locking collar moves between an unlocked position and a locked position. The finger collar includes one or more flexible fingers configured to flex to engage the pin assembly when it is mated with the socket assembly. The locking collar includes one or more windows that are in alignment with respective flexible fingers so the flexible fingers lex through the locking collar to engage the pin assembly and flex and grasp the pin assembly. The locking collar is further rotatable to the locked position that moves the windows out of alignment with the respective flexible fingers and prevents further flexing of the flexible fingers away from the pin assembly to lock the socket assembly in engagement with the pin assembly.

20 Claims, 14 Drawing Sheets

(56) References Cited

U.S. PATENT DOCUMENTS

| | | | | |
|---|---|---|---|---|
| 4,740,746 | A | 4/1988 | Pollock et al. | |
| 4,789,351 | A | 12/1988 | Fisher, Jr. et al. | |
| 4,941,846 | A | 7/1990 | Guimond et al. | |
| 4,958,857 | A | 9/1990 | Sixsmith | |
| 5,217,391 | A | 6/1993 | Fisher, Jr. | |
| 5,329,262 | A | 7/1994 | Fisher, Jr. | |
| 5,423,692 | A | 6/1995 | Francis | |
| 5,439,386 | A | 8/1995 | Ellis et al. | |
| 5,662,488 | A | 9/1997 | Alden | |
| 5,746,619 | A | 5/1998 | Harting et al. | |
| 5,919,066 | A | 7/1999 | Harting et al. | |
| 6,053,777 | A | 4/2000 | Boyle | |
| 6,093,043 | A | 7/2000 | Gray et al. | |
| 6,152,608 | A * | 11/2000 | Ghara .................. | G02B 6/3893 385/60 |
| 6,290,525 | B1 | 9/2001 | Jacobi | |
| 6,773,292 | B2 | 8/2004 | Fawcett | |
| 6,776,668 | B1 | 8/2004 | Scyoc et al. | |
| 6,808,407 | B1 | 10/2004 | Cannon | |
| 7,033,195 | B2 | 4/2006 | Murphy et al. | |
| 7,077,697 | B2 | 7/2006 | Kooiman | |
| 7,347,727 | B2 | 3/2008 | Wlos et al. | |
| 7,354,289 | B2 | 4/2008 | Cannon | |
| 7,416,418 | B2 | 8/2008 | Berthet et al. | |
| 7,601,027 | B2 | 10/2009 | Rosenberger | |
| 7,726,999 | B2 | 6/2010 | Vanzo | |
| 7,887,365 | B1 | 2/2011 | Orner et al. | |
| 7,922,529 | B1 | 4/2011 | Meurer | |
| 7,950,944 | B1 | 5/2011 | Hertzler et al. | |
| 7,972,158 | B2 | 7/2011 | Wild et al. | |
| 7,972,173 | B1 | 7/2011 | Hyzin et al. | |
| 8,033,862 | B2 | 10/2011 | Radzik et al. | |
| 8,052,480 | B2 | 11/2011 | Hauser | |
| 8,171,629 | B2 | 5/2012 | Blew et al. | |
| 8,419,468 | B2 | 4/2013 | Alrutz et al. | |
| 8,460,010 | B2 | 6/2013 | Kimura et al. | |
| 8,491,199 | B1 | 7/2013 | Dang | |
| 8,888,527 | B2 | 11/2014 | Chastain et al. | |
| 9,071,019 | B2 * | 6/2015 | Burris .................. | H01R 13/639 |
| 9,692,174 | B1 | 6/2017 | Yu | |
| 9,917,399 | B2 | 3/2018 | Gessford et al. | |
| 10,096,937 | B2 | 10/2018 | Shao et al. | |
| 10,348,037 | B2 | 7/2019 | Ilie | |
| 10,355,406 | B2 | 7/2019 | Joniak et al. | |
| 2003/0082942 | A1 | 5/2003 | Wlos | |
| 2003/0100213 | A1 | 5/2003 | Yoshigi et al. | |
| 2004/0014363 | A1 | 1/2004 | Khemakhem et al. | |
| 2004/0033711 | A1 | 2/2004 | Loveless et al. | |
| 2005/0239311 | A1 | 10/2005 | Yokoigawa et al. | |
| 2006/0046565 | A1 | 3/2006 | Hosler | |
| 2006/0068623 | A1 | 3/2006 | Purdy | |
| 2006/0068634 | A1 | 3/2006 | Petersen et al. | |
| 2006/0258180 | A1 | 11/2006 | Kerekes et al. | |
| 2008/0014778 | A1 | 1/2008 | Norwood et al. | |
| 2008/0070448 | A1 | 3/2008 | Haller | |
| 2008/0113536 | A1 | 5/2008 | Antonini et al. | |
| 2008/0254668 | A1 | 10/2008 | Rosenberger | |
| 2009/0280685 | A1 | 11/2009 | Gray | |
| 2010/0105235 | A1 * | 4/2010 | Friedrich ............. | H01R 13/622 439/321 |
| 2010/0124835 | A1 | 5/2010 | Johnson | |
| 2010/0176896 | A1 | 7/2010 | Payne | |
| 2010/0267291 | A1 | 10/2010 | Chabineau-Lovgren et al. | |
| 2011/0312199 | A1 | 12/2011 | Alrutz et al. | |
| 2013/0029522 | A1 | 1/2013 | Holliday et al. | |
| 2014/0120766 | A1 * | 5/2014 | Meister ................ | H01R 9/0524 439/578 |
| 2014/0322969 | A1 | 10/2014 | Palinkas et al. | |

* cited by examiner

ELECTRICAL CONNECTOR ASSEMBLY WITH SNAP LOCKING FEATURES

FIELD OF THE INVENTION

The invention is directed generally to an electrical connector and particularly an electrical connector with a locking feature.

BACKGROUND OF THE INVENTION

For the provision of various electrical signals and other signals, including power signals, in a structure such as an aircraft, a number of electrical connector solutions have been offered. Oftentimes, such solutions are labor intensive and require various mounting and connection techniques that are complicated, labor intensive and will require sets of specialized tools. In other available solutions, some of the connection components have to installed with the help of multiple installers. In still other solutions, connection components must be specifically oriented or "clocked" during the installation to ensure alignment and proper connections.

At the same time, as may be appreciated, such electrical connections in an aircraft environment must be robust and able to withstand the harsh environments associated with air travel. Connector assemblies have to be able to handle motion and vibration stresses that can jeopardize the integrity of the electrical connection. However, the robustness of an assembly must be balanced with weight concerns for aircraft installations where weight is always a factor. Still further, because of the need for all usable space, wiring and connectors must be compact and efficient in their design.

In the use of electrical connectors and assemblies, it will be necessary in certain installations to make repairs to damaged wiring or connectors. Splicing together wires may be required, for example. Similarly, in other installations, modifications to the wiring schemes and layouts might be required. Accordingly, the need for rapid disconnection and reconnections is a consideration that must also be addressed in various electrical wiring and connection scenarios, particularly in an aircraft environment.

In a connector scheme, pin and socket connections are desirable arrangements for their robust nature, alignment features and ease and strength of connection. However, many such pin and socket connector solutions are often large in size, which works against space considerations and may prevent installation in tight areas. Furthermore, many such connectors are screwed together which slows the installation process, particularly for high density applications. Furthermore, with existing connector systems, if one component is damaged, it may require a complete replacement of the assembly.

Therefore, many needs still exist in this area of technology regarding providing an efficient and robust electrical connection for a variety of applications. There is further a need for an efficient and robust installation solution within an aircraft environment.

SUMMARY OF THE INVENTION

An electrical connector and related cable using such a connector includes a pin assembly including a pin that interfaces with a conductor and a socket assembly to mate with the pin assembly that interfaces with another conductor, such as for forming a cable. The socket assembly includes a socket body configured to receive the pin. A finger collar surrounds the socket body, and a locking collar surrounds and is rotatable on the finger collar. The locking collar moves between an unlocked position and a locked position.

The finger collar includes one or more flexible fingers that are positioned around the finger collar and are configured to flex to engage the pin assembly when it is mated with the socket assembly. The locking collar includes one or more windows that are in alignment with respective flexible fingers when the locking collar is in the unlocked position. The flexible fingers may then flex through the locking collar to engage the pin assembly and flex and grasp the pin assembly. After the finger collar engages the pin assembly, the locking collar is further rotatable to the locked position. The further rotation moves the windows out of alignment with the respective flexible fingers which then prevents further flexing of the flexible fingers away from the pin assembly. This keeps the socket assembly in engagement with the pin assembly to lock the mated pin assembly and socket assembly together.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
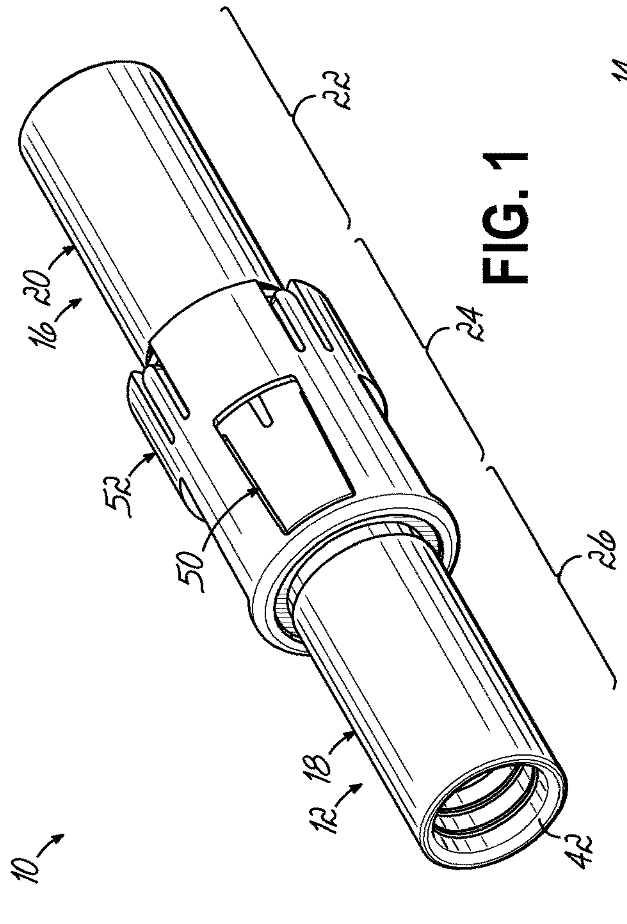
FIG. 1 is a front perspective view of an assembled connector assembly in accordance with an embodiment of the invention.

FIG. 1 illustrates an electrical connector assembly or connector 10 in accordance with the present invention. The electronical connector 10 is formed by the mating of a mail assembly or pin assembly 12 having a pin 14 with a female assembly or socket assembly 16 having an opening 34 into a socket portion. In accordance with one aspect of the invention, the electrical connector 10 incorporates a socket assembly 16 that has locking features to lock the pin assembly 12 in the socket assembly 16 when they are mated to ensure a robust electrical connection. The connector can be moved between a locked position and an unlocked position.

Figure 2:
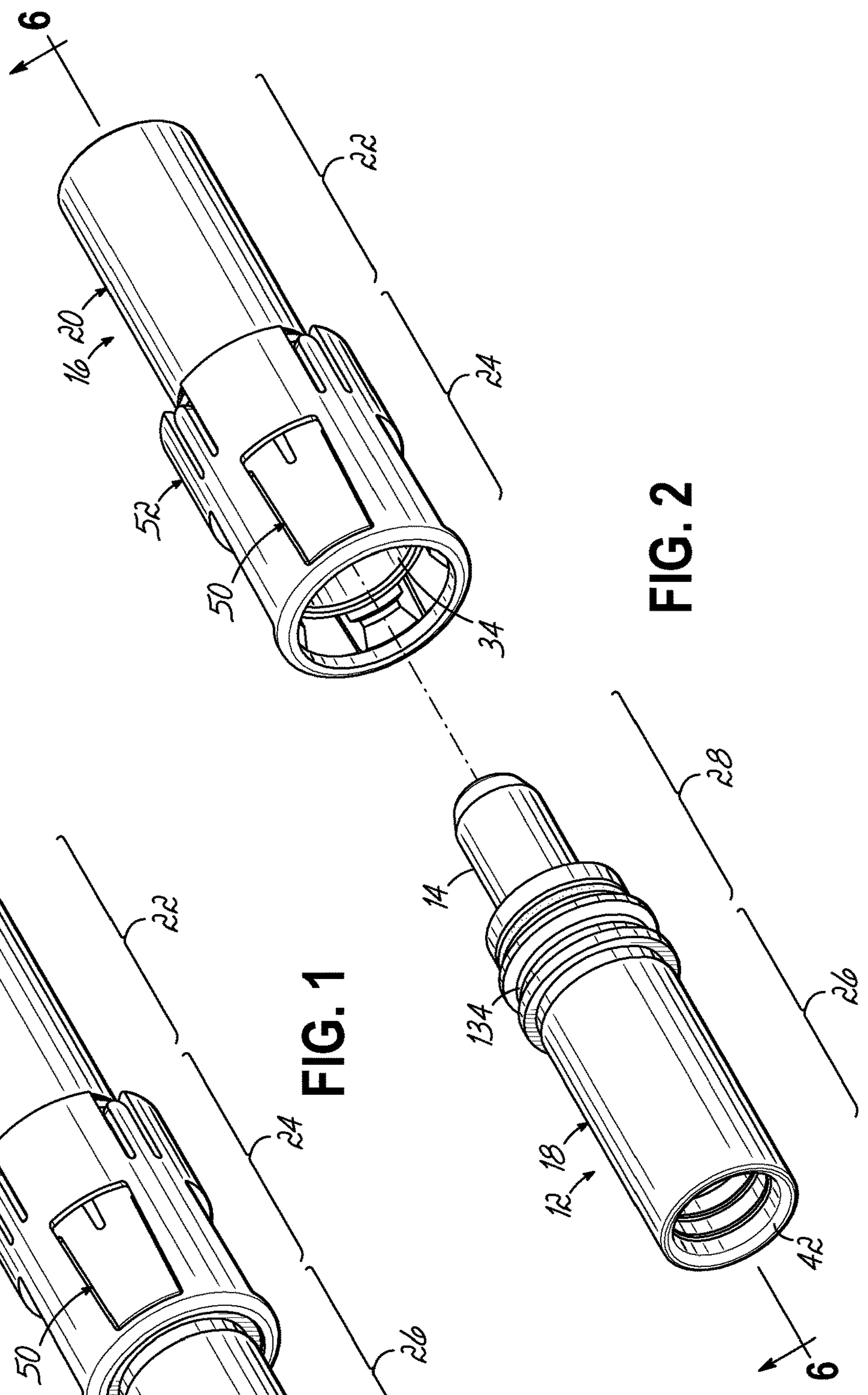
FIG. 2 is a front perspective view of a disassembled connector assembly in accordance with the embodiment of the invention of FIG. 1.

Referring to FIG. 2, each of the pin assembly 12 and socket assembly 16 incorporate a body 18 and 20, respectively. The body 20 of the socket assembly 16 includes a crimp barrel or crimp portion 22 for receiving a conductor (see FIG. 13) and a socket portion 24 for receiving a pin of the pin assembly 12. Similarly, the pin assembly body 18 includes a crimp barrel or crimp portion 26 for receiving a conductor and a pin portion 28 that includes a pin 14 that is configured to fit within the socket portion 24 when the connector is mated.

Figure 5:
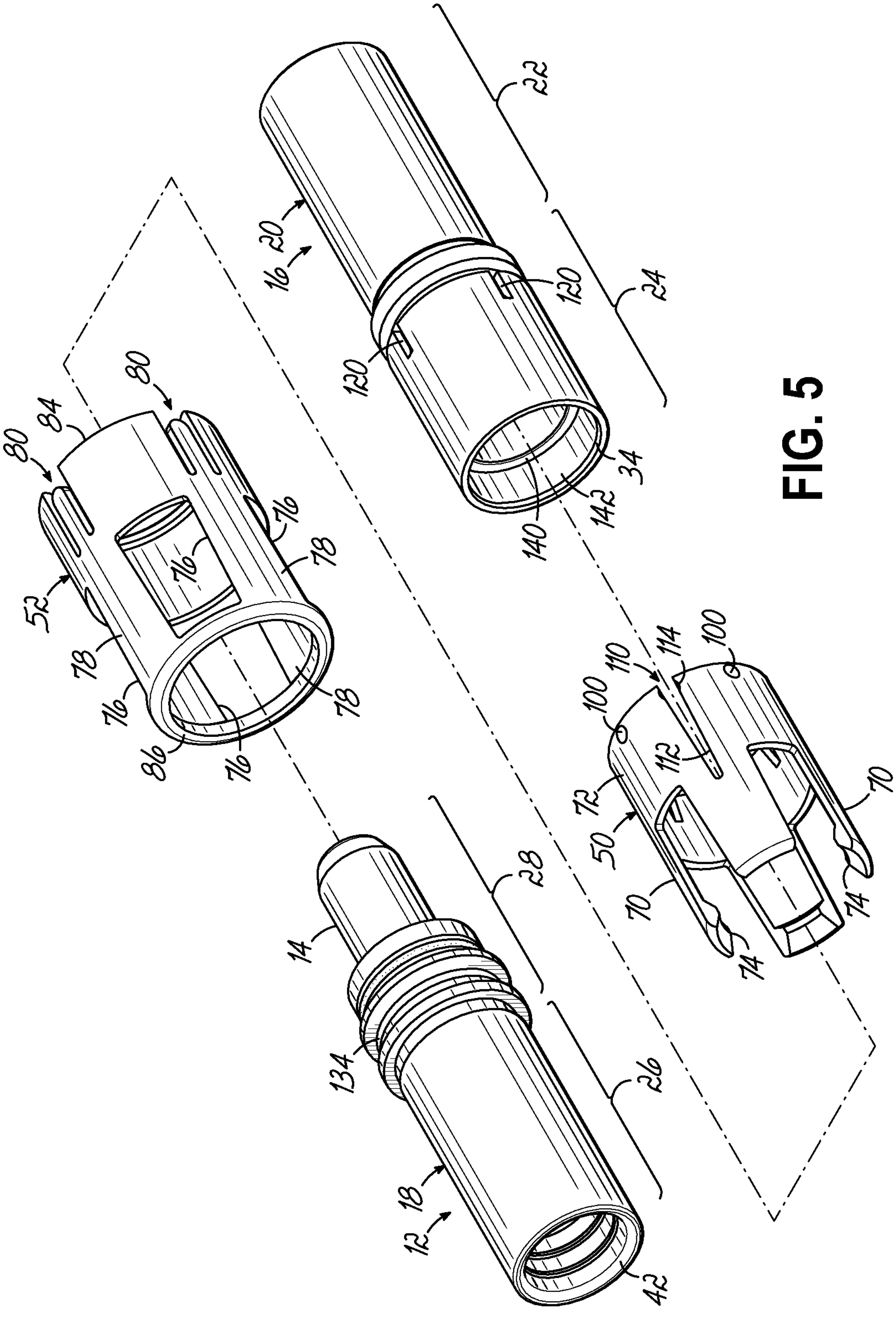
FIG. 5 is an exploded front perspective view of a disassembled connector assembly in accordance with the embodiment of the invention of FIG. 1.
Figure 6:
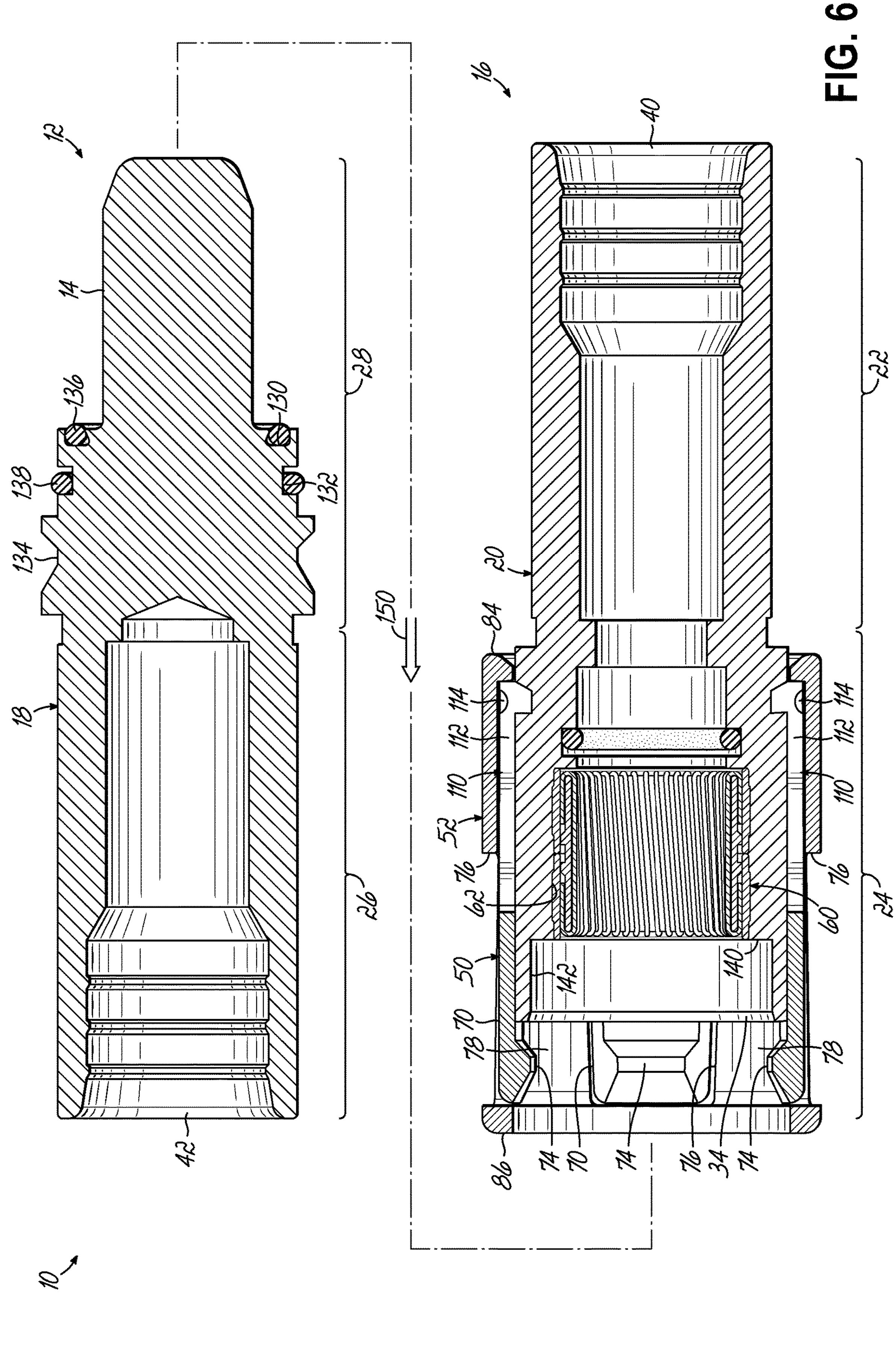
FIG. 6 is an side cross-sectional view of a disassembled connector assembly in accordance with the embodiment of the invention of FIG. 1.

Referring now to FIG. 5, the electrical connector 10 is shown in an exploded view with various of the components separated from each of the respective assemblies. Pin portion 28 and pin 14 are configured to be received into an opening 34 of the socket portion 24 of socket assembly 16 when the two assemblies are mated to form the electrical connection. Each of the pin assembly 12 and socket assembly 16 are configured of a suitably conductive metal, such as copper and/or aluminum. Each of the respective crimp portions 22, 26 are appropriately formed for receiving the end of an electrical conductor, such as a wire. Referring to FIG. 6, the wire is received into an opening 40 of the crimp portion 22 and another conductor or wire may be received into the opening 42 of the crimp portion 26 of the pin assembly. Each of the openings 40, 42 may be appropriately formed for capturing and holding the end of a wire when the crimp portions 22, 26 are appropriately crimped, such as using a crimping tool. In that way, any electrical signals handled by a wire are passed to the appropriate socket portion 24 or pin portion 28 so that when the electrical connector is mated as shown in FIG. 1, the signal passes through the electrical connector and along the length of the wire that incorporates the electrical connector 10. In accordance with one aspect of the invention, the electrical connector incorporates a locking feature to lock the pin assembly into the socket assembly.

Figure 4:
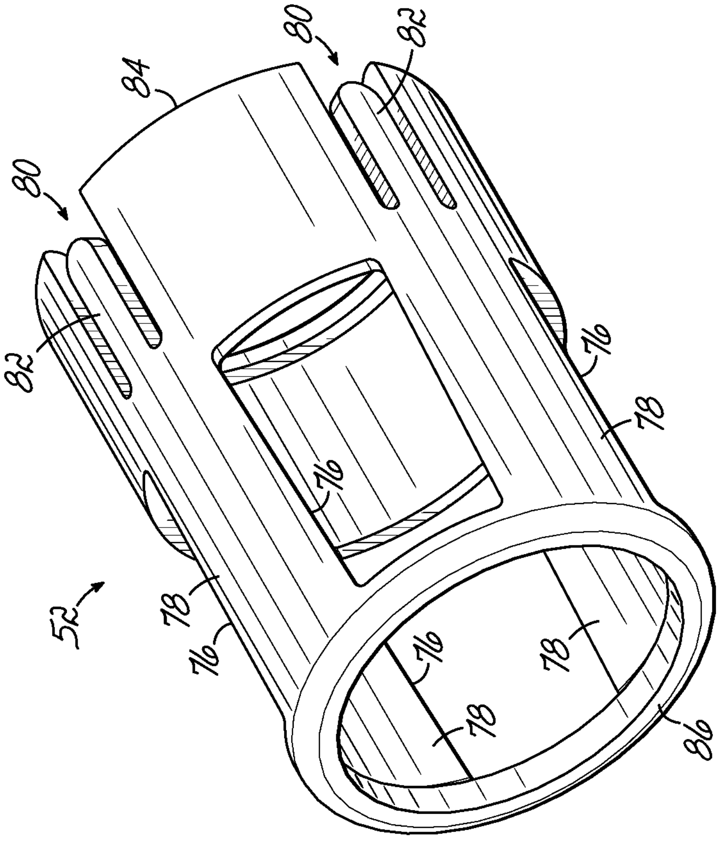
FIG. 4 is a front perspective view of a locking collar element used in a connector assembly in accordance with an embodiment of the invention.
Figure 3:
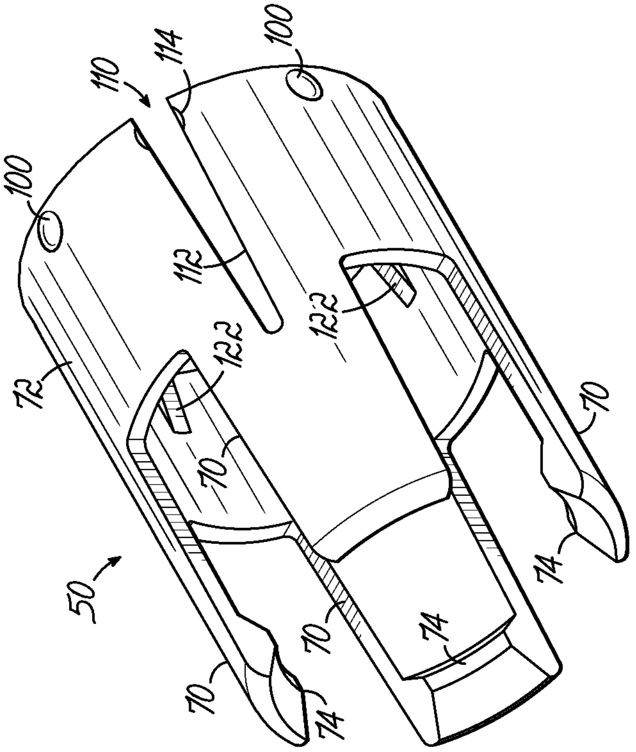
FIG. 3 is a front perspective view of a finger collar element used in a connector assembly in accordance with an embodiment of the invention.

More specifically, as illustrated in FIGS. 3 and 4, the socket assembly 16 incorporates a finger collar 50 that is placed on the socket body 20 and surrounds the socket body proximate the socket portion 24. The socket assembly also includes a locking collar 52 that is placed coaxially over the finger collar and is rotatable on the finger collar and the socket portion 24. The locking collar can be rotated between an unlocked position and a locked position, as described further herein. The locking collar 52 and finger collar 50 operate together to engage and secure the pin assembly 12 with the socket assembly 16 and to specifically lock the pin 14 into engagement with the socket portion 24. Referring again to FIG. 6, to assist in the electrical connection provided between the pin assembly and socket assembly, a conductive insert 60 may be utilized. In one embodiment, the conductive insert 60 is a conductive spring made of a material such as beryllium copper that is configured to receive the pin 14 and is compressed between the internal wall 62 of the socket portion 24 as illustrated in FIG. 6 and the pin. Suitable conductive inserts might be utilized to improve conduction across the mated assemblies. The insert 60 insures good signal conduction between the pin 14 and the socket portion 24 of body 20 of the socket assembly 16.

Referring again to FIGS. 3 and 4, the finger collar incorporates at least one flexible finger 70, which flexes with respect to the finger collar 50. In the illustrated embodiment of FIG. 3, the finger collar incorporates a plurality of flexible fingers 70, such as four fingers, equally spaced around a cylindrical base 72 of finger collar 50. Finger collar 50 is formed of a suitable plastic material, such as high temperature polymer, such as PEEK, to allow for the flexible fingers 70 to flex with respect to the base and thereby engage the pin assembly 12, and particularly to engage the pin portion 28 of that pin assembly. When mating the two assemblies as shown in FIG. 2 to form the connector, the fingers 70 flex radially outwardly to fit over the pin portion 28 to engage locking features of the pin portion and then to radially flex back into their original position and engage the features and lock the socket assembly with the pin assembly as described further herein.

Figure 7:
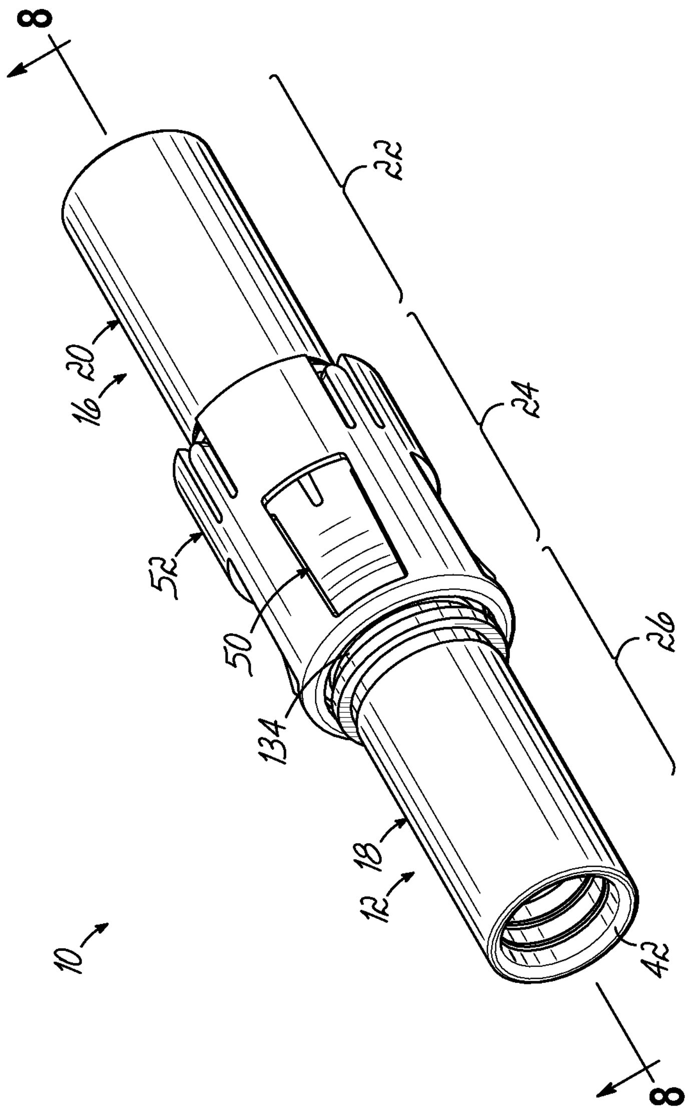
FIG. 7 is a front perspective view of a connector assembly in accordance with the embodiment of the invention of FIG. 1 with a pin assembly engaging the socket assembly in an unlocked position.

In accordance with one feature of the invention, as illustrated in FIG. 4, the locking collar 52 includes at least one window 76 that is aligned with at least one flexible finger 70 in an unlocked position of the locking collar. In the illustrated embodiment of FIG. 4 the locking collar 52 incorporates a plurality of windows 76, such as four windows 76, each reflective of the four flexible fingers 70. Of course, a greater or lesser number of fingers 70 and windows 76 might be implemented in the invention. As shown in FIG. 7, when the two assemblies 12 and 16 are mated, the locking collar is rotated to the unlocked position and the windows 76 align with the respective flexible fingers 70. In that way, the flexible fingers may flex radially outwardly through the locking collar and particularly through the windows 76 so that the flexible fingers may expand radially and engage the pin portion 28 of the pin assembly as the pin 14 is received into the socket portion 24 of the socket assembly 16. Once the pin assembly is fully seated in the socket assembly, the flexible fingers 70 may flex back to their normal or rest position and engage locking features of the pin assembly. The locking collar may then be rotated to a locked position to move the various windows 76 out of circumferential alignment with the flexible fingers 70. In the locked position, intervening solid sections 78 of the locking collar, alternate between the open windows 76, would then be aligned with and overlying the flexible fingers preventing them from flexing radially outwardly through the locking collar. The locking collar then keeps the flexible fingers in engagement with the pin assembly 12 to lock the mated pin assembly and socket assembly together.

In accord with another feature of the invention, the locking collar 52 incorporates at least one locking indicator 80. The locking indicator 80 is configured for flexing radially outwardly from the locking collar when the locking collars is in the unlocked position and then is further configured for lying generally flush with the locking collar when the locking collar is in the locked position. In the illustrated embodiment, locking collar 52 incorporates a plurality of locking indicators 80 and particularly utilizes four locking indicators, reflective of the four flexible fingers 70. The locking indicators 80 are in longitudinal alignment on locking collar 52 with the solid sections 78. One version of the locking indicator 80 is in the form of a flexible tine that flexes radially outwardly on the locking collar 52. The locking indicators are positioned at an end 84 of the locking collar 52 opposite to a pin receiving end 86 of the locking collar.

The locking indicators 80 operatively engage with the finger collar 50 in the performance of their indication to a user of whether the locking collar 52 and socket assembly 16 are in an unlocked position or a locked position. Specifically, the locking indicators engage indents in the flinger collar. Referring to FIG. 3, one or more indents 100 are formed within the base section 72 of finger collar 50. In the illustrated embodiment, the indents 100 are positioned circumferentially around the base section 72 between the orientations of the flexible finger 70. As may be appreciated, the four indents 100 are positioned in an angular orientation around the base section at 90 degree intervals around the base section. With respect to the flexible fingers 70, the indents 100 are offset generally about 45 degrees from the center of the flexible fingers 70 and between the fingers. Positioned in alignment with the fingers 70 are indents that are in the form of depressions 110 that are deeper than the indents and are formed by slots 112 formed in the finger collar and adjacent transition sections 114. The slot 112 and transition sections 114 cooperate to receive the locking indicators when the locking collar is rotated to the locked position as described. The illustrated embodiment also uses four depressions 110 that are also spaced at 90 degree intervals around the base section, but offset from the indents 100.

Referring to FIG. 4, a similar aligned arrangement of the indicators 80 and windows 76 is utilized in the locking collar 52. Specifically, the locking indicators 80 are arranged at 90 degree intervals angularly around the locking collar and are offset generally around 45 degrees from the center of the windows 76 which are themselves arranged at 90 degree intervals around the locking collar. The locking collar 52 may be rotated to align the locking indicators with either the indents 100 or the depressions 110. In the unlocked position, when the locking collar 52 is rotated on the finger collar 50 of the socket assembly and the indicators 80 are aligned with the indents 100, the windows 76 are aligned with the flexible fingers 70. The fingers may then flex through the windows. However, the depths of the indents are configured so that the locking indicators will not fully seat back to a position that is flush with the outer surface of the locking collar. The locking indicators will thus be visually and tactilely raised to provide a user an indication of the connector being in the unlocked position.

Figure 8:
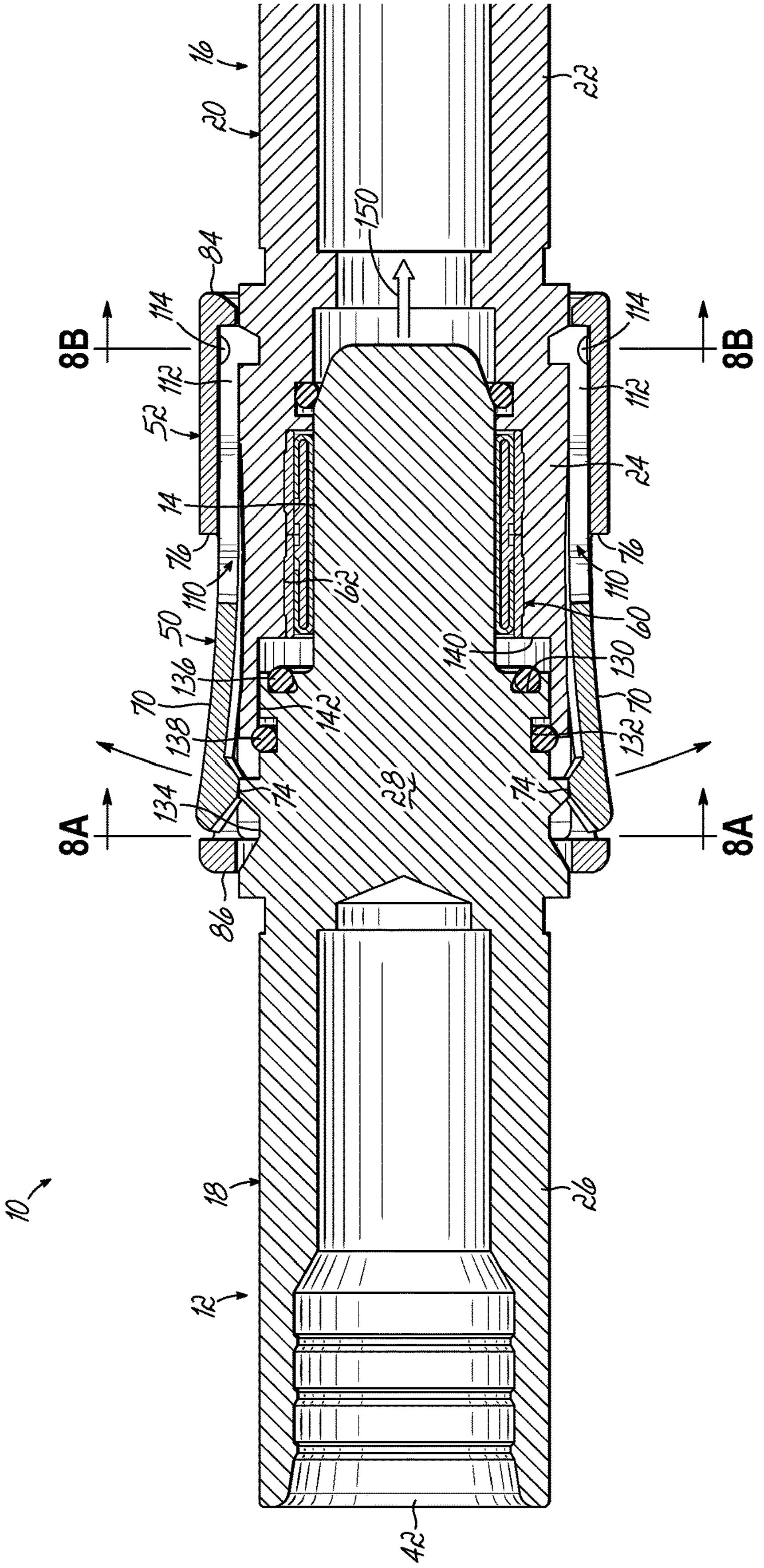
FIG. 8 is a side cross-sectional view of the connector assembly of FIG. 7 with a pin assembly engaging the socket assembly in an unlocked position.
Figure 8B:
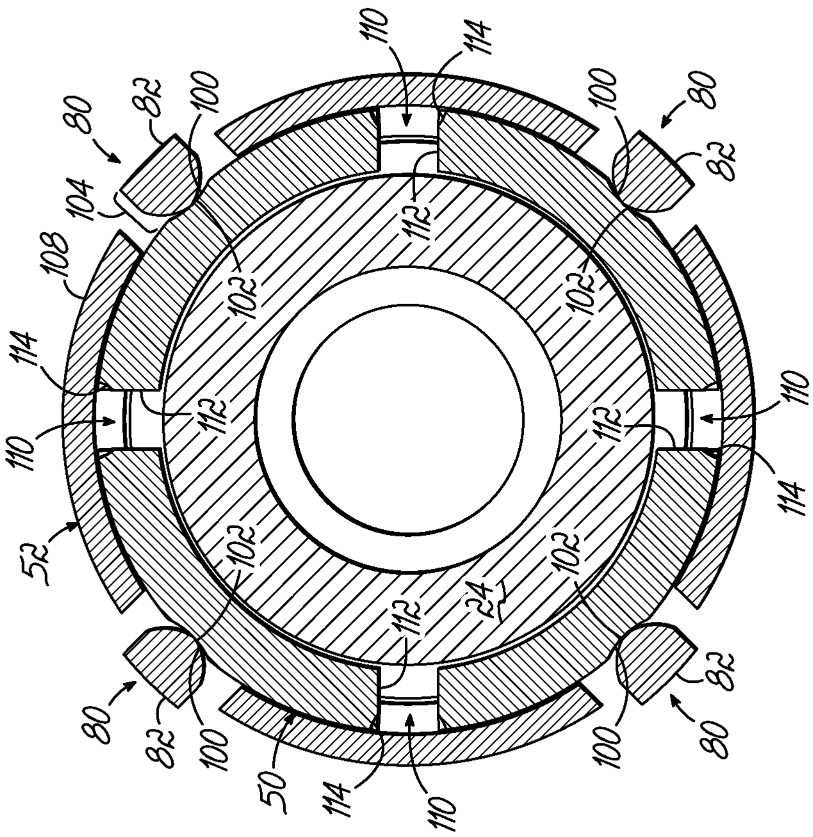
FIG. 8B is a cross-sectional view of FIG. 7 along lines 8B-8B.
Figure 8A:
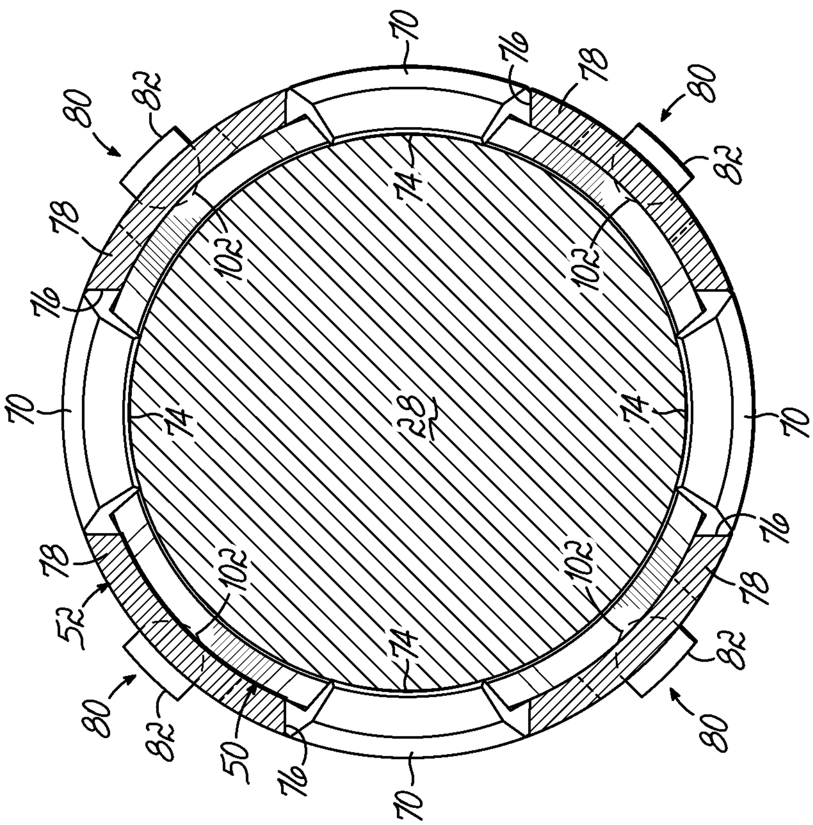
FIG. 8A is a cross-sectional view of FIG. 7 along lines 8A-8A.
Figure 12:
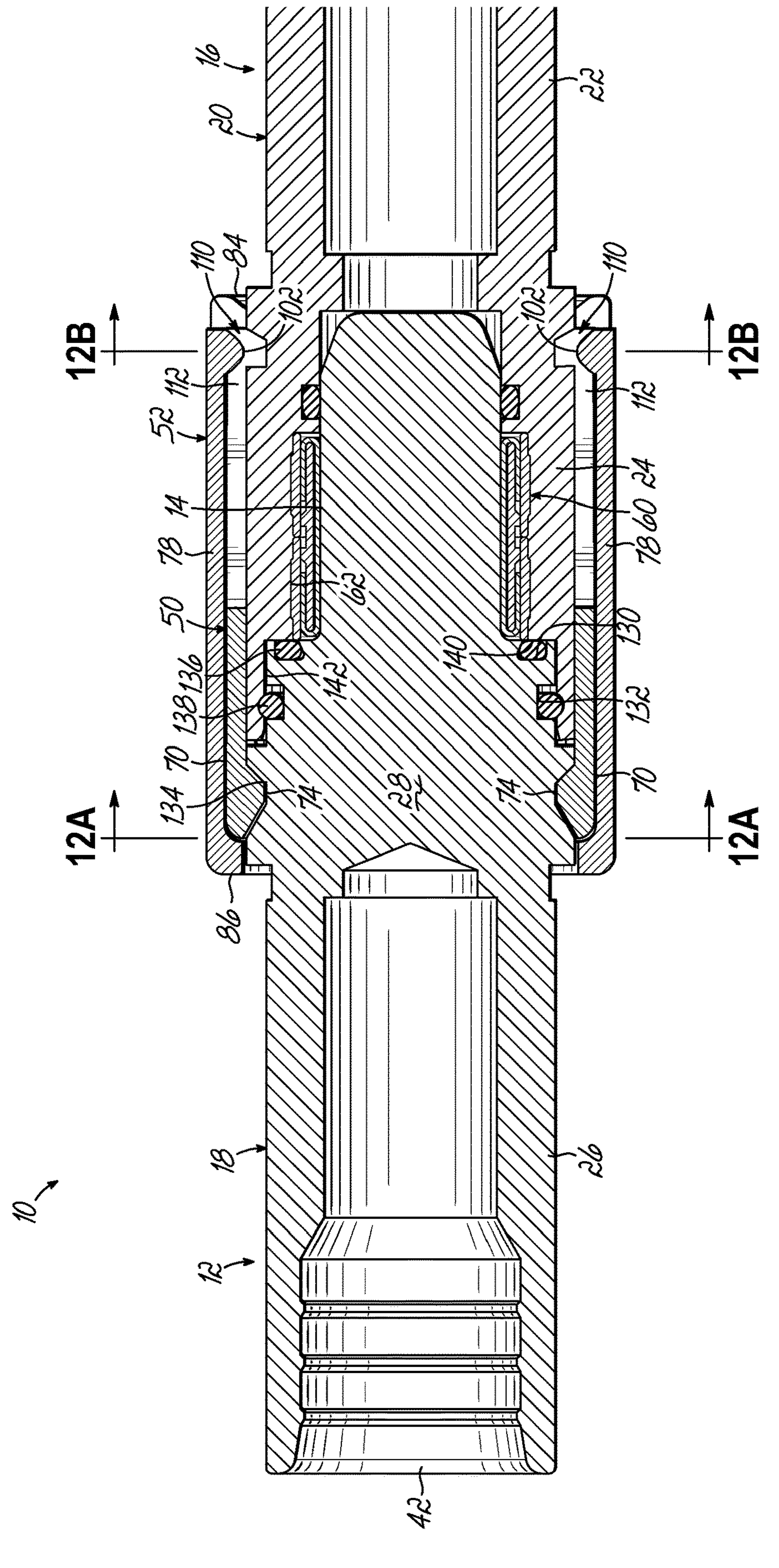
FIG. 12 is a side cross-sectional view of the connector assembly of FIG. 11 with a pin assembly engaged in the socket assembly in the locked position.
Figure 12B:
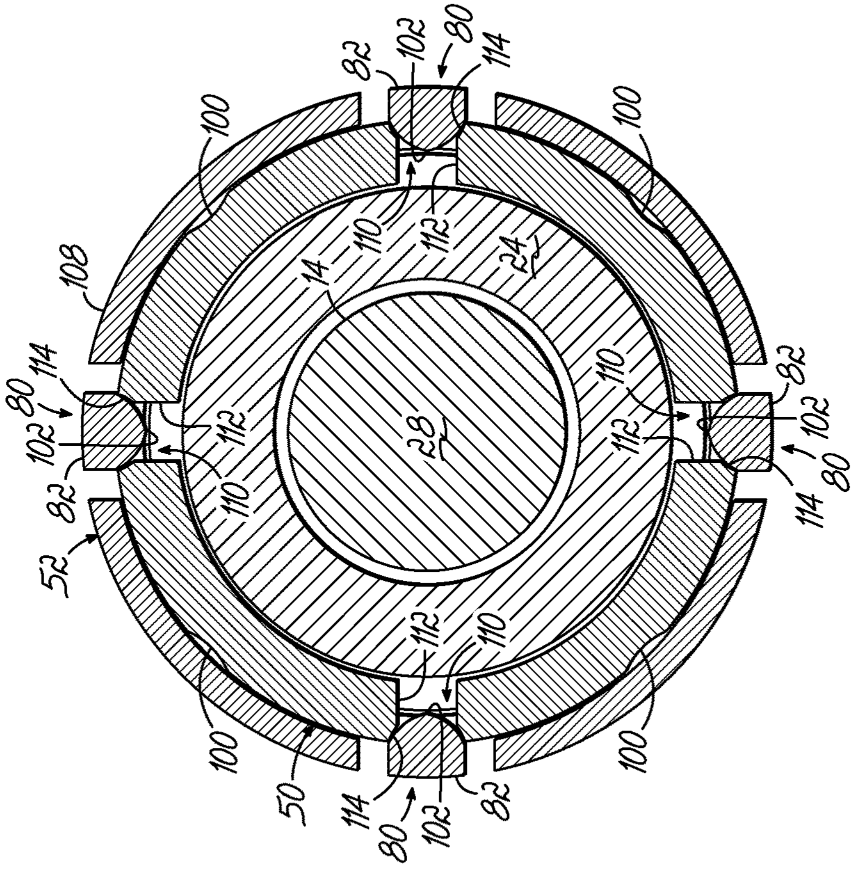
FIG. 12B is a cross-sectional view of FIG. 10 along lines 12B-12B.
Figure 12A:
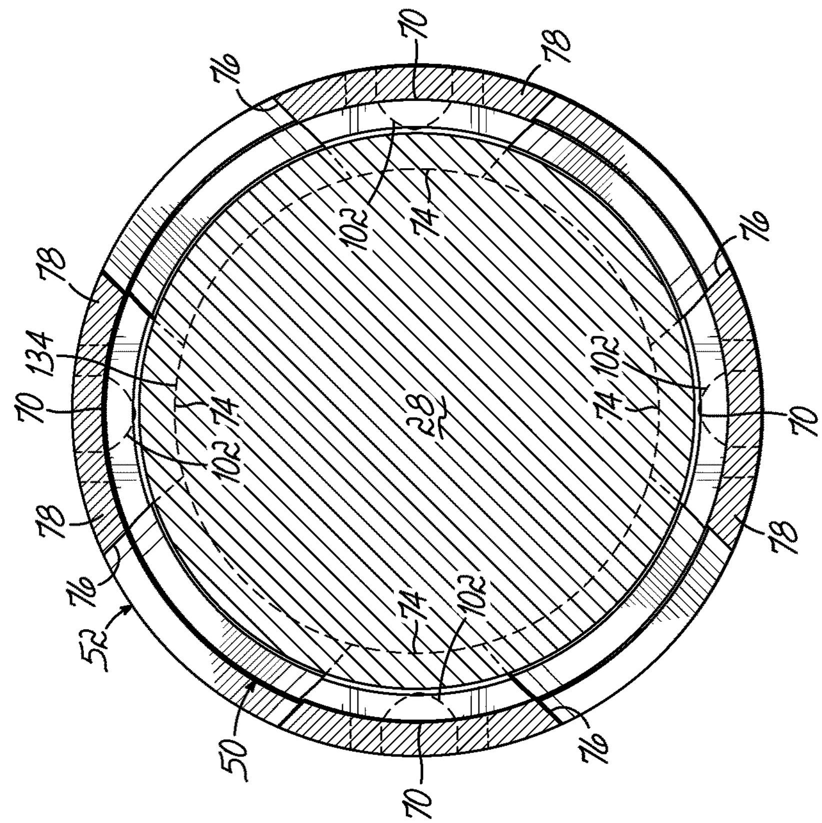
FIG. 12A is a cross-sectional view of FIG. 10 along lines 12A-12A.

Referring to FIGS. 8A and 8B, each of the locking indicators and particularly the tines 82 forming the locking indicators incorporate a feature 102 that is configured for engaging the respective indents 100. In the illustrated embodiment, the indents might be rounded indents or depressions 100 formed with a complementary shape to the tine features 102. For example, the features 102 of each of the flexible tines 82 might have a complementary round shape to fit into the shaped indents 100. Referring to FIG. 8B, each of the features 102 may have a respective depth 104 that is greater than the depth of the indent 100. In that way, as shown in FIG. 8B, the feature 102 and the tine 82 associated therewith extends above an outer surface 108 of the locking collar. Thereby, the locking indicators 80 provide both the visual and tactile indication to a user that the locking collar is in the unlocked position. In that unlocked position, the flexible fingers 70 may flex through the windows 76 of the locking collar. Alternatively, when the locking collar 52 is rotated to the locked position as shown in FIGS. 12A and 12B, the locking indicator engages the deeper depression 110 that is formed in the finger collar 50. Particularly, referring to FIG. 3, depression 110 includes the slot 112 formed in the finger collar. In the illustrated embodiment, as noted, the plurality of slots 112 are formed each aligning generally angularly around the base section 72 with flexible fingers 70. The end of the slot 112 engaged by features 102 of the tines 82 incorporates the rounded or sloped transition sections 114 that are also shaped similarly to feature 102 to provide a smooth transition into the depression 110. The deeper depression 110 then receives feature 102 of each of the tines 82 so the tines can flex radially inwardly further than with the indents 100. Referring to FIG. 12B, when the locking collar is rotated to the locked position, the tines 82 forming each of the locking indicators 80 will then lie generally flush with the locking collar 52. That is, the slots 112 and the transition sections 114 are configured to generally completely receive the features 102 of the locking indicators 80 so that the tines 82 are flush. In that way, the visual and tactile indications of an unlocked collar disappear and the user may see and feel that the locking collar 52 is in the locked position by the smooth outer surface 108 of the locking collar to thereby lock the flexible fingers 70 and lock the mated pin assembly 12 and socket assembly 16 together.

Turning now to FIG. 7, the figure illustrates the connector 10 with the pin assembly 12 initially mating with the socket assembly 16. More specifically, the pin 14 and pin section 28 have been received into the socket portion 24 with the finger collar 50 and the locking collar 52 surrounding the pin 14 and pin portion 28. As discussed herein, the finger collar 50 is generally stationary on the socket portion 24 of the socket assembly while the locking collar 52 rotates. To secure the finger collar and prevent rotation, mating features between the finger collar and the socket assembly are utilized. Specifically, referring to FIGS. 3 and 5, the socket portion 24 of socket assembly 16 incorporates a plurality of locking slots 120 that are positioned angularly around the socket assembly. To mate with the slots, the locking collar incorporates a plurality of equally spaced fins 122 that are configured and spaced to fit inside the slots 120. When the finger collar 50 is placed over the socket portion 24 of socket assembly 16, the fins 122 align with the slots 120 and fit therein thus preventing rotation of the finger collar 50 around the socket assembly. As discussed, the locking collar then rotates around the finger collar of the socket portion as the locking indicators 80 engage respective indents 100 or slots 110.

Referring to FIG. 8, when the pin assembly and socket assembly are initially mated as shown in the cross-section of FIG. 8, the pin 14 is received in the opening 34 of the socket and engages the conductive insert 60 and compresses the insert between the internal wall 62 of the socket portion and the pin 14 for good electrical conduction across the connector. The pin portion 28 incorporates one or more seals for sealing the pin 14 when it is mated with the socket assembly. To that end, in an outer surface of the pin portion 28, a plurality of grooves are formed for acting as a seal seat or as a locking groove for the fingers 70 of the finger collar 50. Referring again to FIG. 8, a groove 130 forms a seal seat for a seal, such as an O-ring seal 136 that engages a face surface of the socket portion and acts as a dampening seal. Another groove 132 forms at the seal seat for another seal 138, such as an O-ring seal. The seal 136 is compressed against a face or ridge 140 formed in the opening 34 of the socket portion. Whereas seal 138 seats against a surface 142 around the socket portion rearwardly of seal 136 when the pin assembly and socket assembly are mated and locked together. Arrow 150 is indicative of the direction of travel of the pin assembly as it mates with the socket assembly.

FIGS. 8A and 8B illustrate selective cross-sections showing the annular engagement of the finger collar 50 and locking collar 52 with the socket assembly and the pin assembly. Specifically, the cross-section of FIG. 8A illustrates the various fingers 70 of the finger collar flexed outwardly as it travels over the pin portion 28 of the pin assembly 12 to engage with a locking groove 134 as shown in FIG. 8. Each of the fingers includes a shaped ridge 74 this is configured and shaped to mate with the locking groove 134 as the assemblies are mated. Complementary cross-sectional shapes with respect to the ridges 74 and the locking groove 134 may be seen in FIG. 8. The flexible fingers 70 flex radially outwardly to pass over respective sections of the pin portion 28 that have greater outer diameter than the outer diameter of the locking groove 134 as seen in FIG. 8.

Referring now to FIG. 8B, the cross-section illustrates the locking collar 52 as well as the locking indicators 80 and their respective tines 82 that flex in the locking collar. The tine features 102 are seated in respective indents 100 in the finger collar. As noted herein, the locking indicators 80 are offset from the windows 76 so that when the features 102 are seated in the indents, the windows 76 are aligned with the fingers 70 allowing the fingers to flex therethrough. This allows the assemblies 12 and 16 to mate with the pin 14 plugging into the socket portion 24 and the fingers 70 flexing over sections of the pin portion 28 of the pin assembly. That is, the pin may be plugged into the socket.

Figure 9:
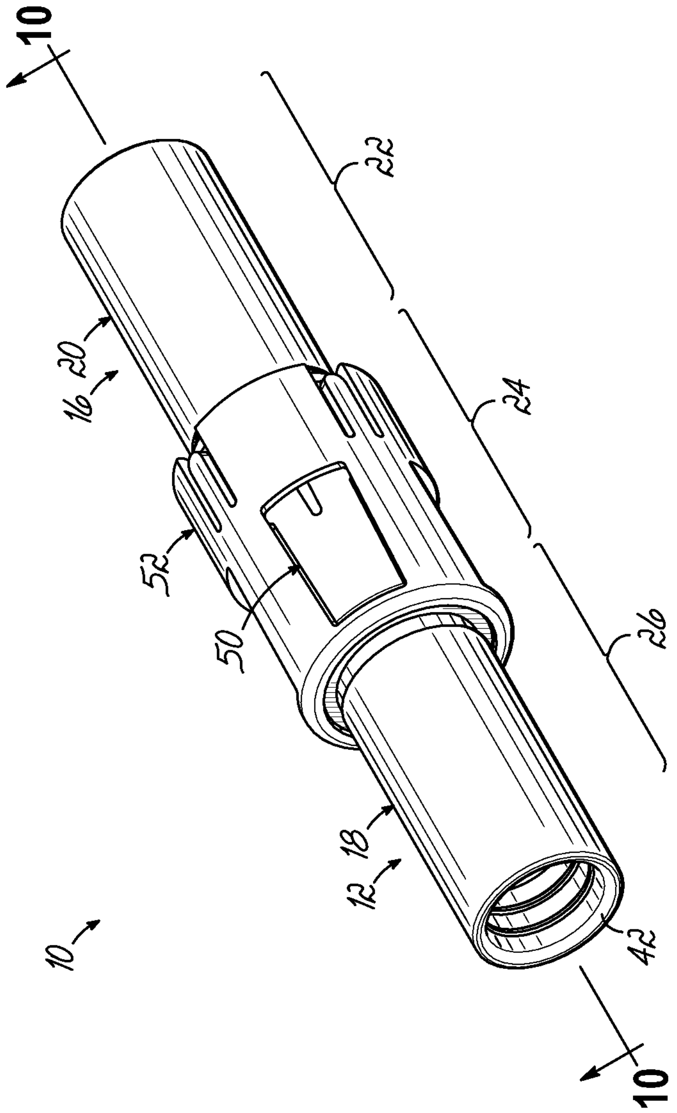
FIG. 9 is a front perspective view of a connector assembly in accordance with the embodiment of the invention of FIG. 1 with a pin assembly engaged in the socket assembly in an unlocked position.
Figure 10:
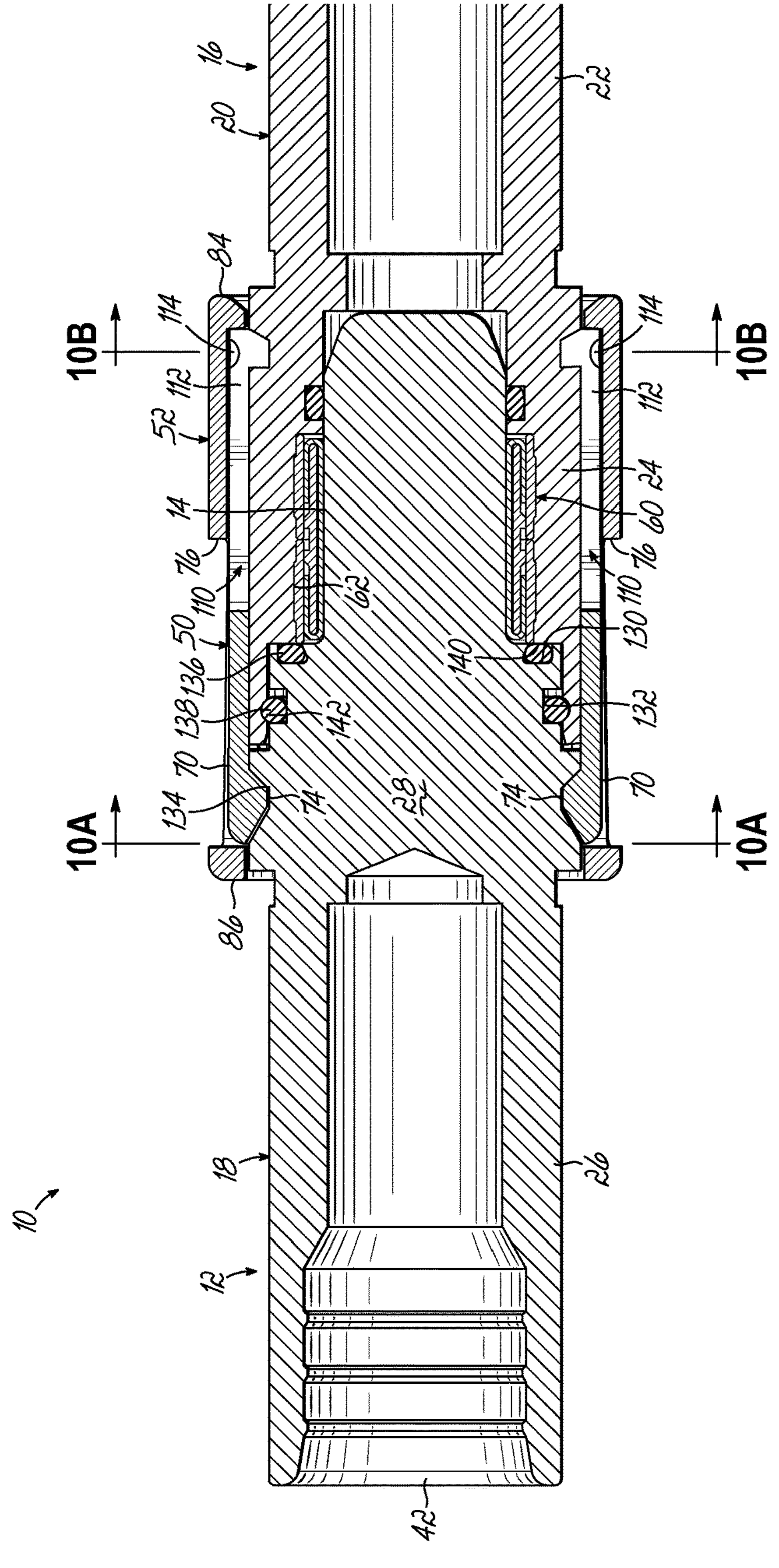
FIG. 10 is a side cross-sectional view of the connector assembly of FIG. 9 with a pin assembly engaged in the socket assembly in an unlocked position.

Turning now to FIG. 9, the pivot assembly 12 is shown to be fully mated or fully seated with the socket assembly 16 but still in an unlocked position, by seating the pin portion in the socket portion, it aligns the ridges 74 of each of the flexible fingers with the locking groove 134. The flexible fingers that are flexed as shown in FIG. 8 then flex back to their rest position and seat the ridges 74 of each of the flexible fingers within the locking groove 134 thereby holding the two assemblies mated together. Referring to FIG. 10, the seals 136 and 138 are seated and compressed and the pin 14 presses against the conductive insert 60 for good electrical connection. The engagement of the fingers and the ridges 74 in the locking groove 134 hold the pin portion 28 within the socket portion 24 against forces meant to unplug or unmate the two connector assemblies. In the unlocked position, the two assemblies 12, 16 may be pulled apart and separated and again plugged together manually based upon the use of the connector.

Cross-sections 10A and 10B then show the mated assemblies in the unlocked position. The cross-sections resemble FIGS. 8A and 8B, however, the flexible fingers 70 now lie generally flush with the rest of the finger collar 50 as their ends are seated in the locking groove 134. The windows 76 are still aligned over the top of the flexible fingers 70 and may flex therethrough still, such as to unplug the assemblies, if desired. The pin assembly 12 and socket assembly 16 may be pulled apart or unmated by a manual force sufficient to slide the fingers 70 out of groove 134 so they flex through the respective windows 76.

Figure 10B:
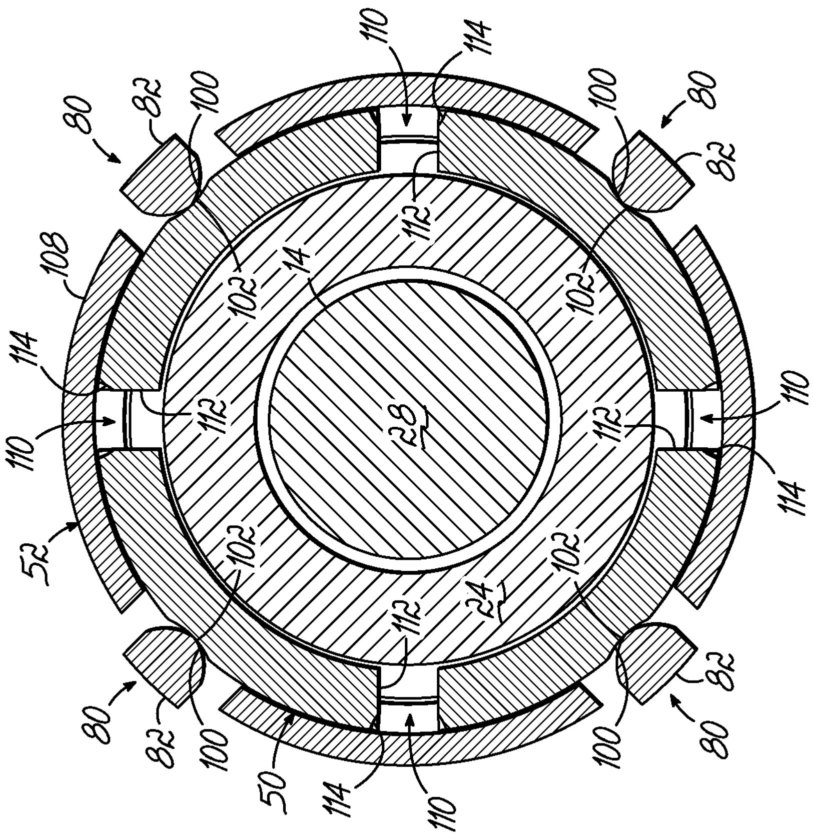
FIG. 10B is a cross-sectional view of FIG. 7 along lines 10B-10B.
Figure 10A:
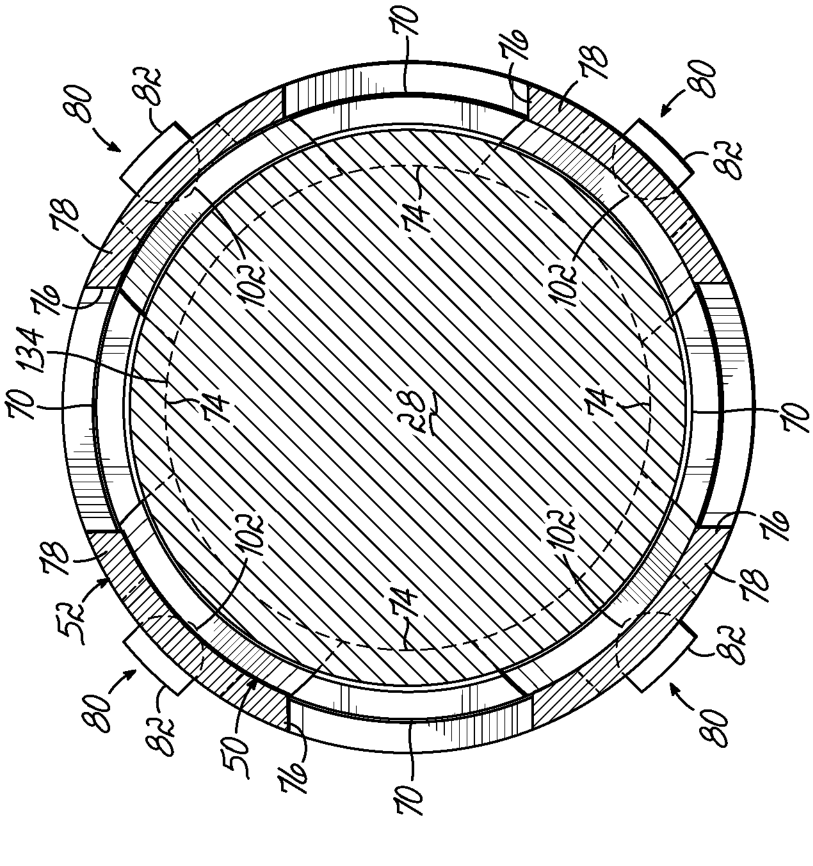
FIG. 10A is a cross-sectional view of FIG. 7 along lines 10A-10A.
Figure 11:
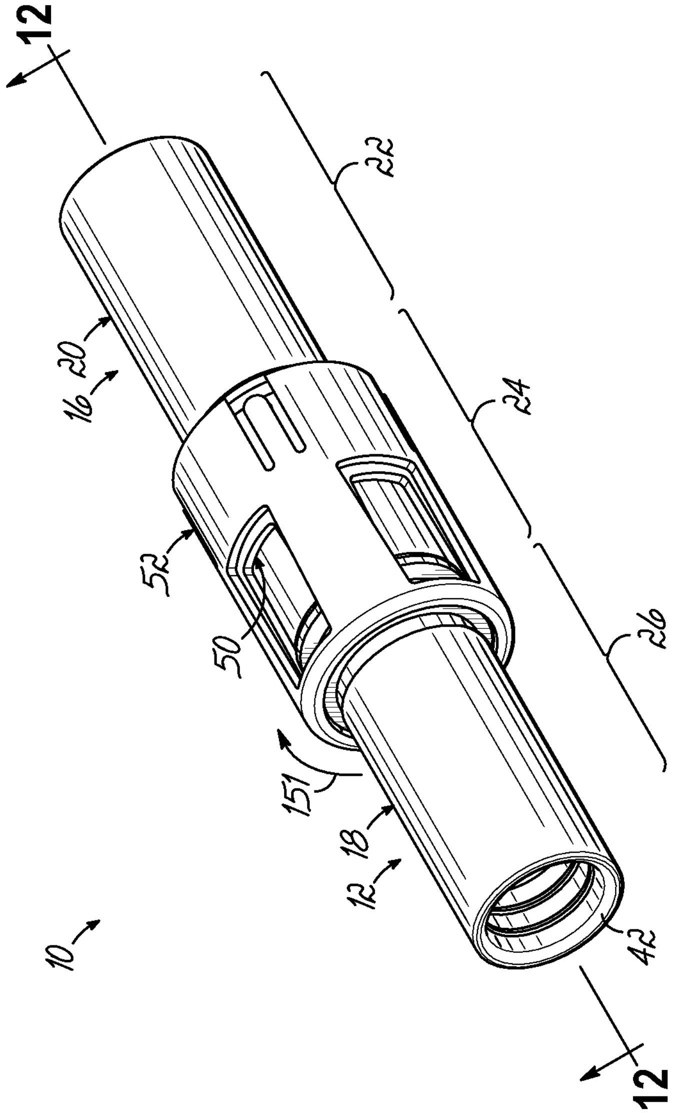
FIG. 11 is a front perspective view of a connector assembly in accordance with the embodiment of the invention of FIG. 1 with a pin assembly engaged in the socket assembly in a locked position.

In accordance with one aspect of the invention, to lock the two assemblies 12, 16 together, the locking collar 52 is rotated on the finger collar 50 and socket portion 24 to the locked position. Specifically, as shown in FIG. 11, the locking collar 52 may be rotated, such as in the direction of arrow 151. As will be understood, the locking collar 52 might be rotated in the other direction as well. As seen in FIGS. 10A and 10B, even though the assemblies 12 and 16 are fully mated and the flexible fingers are seated within the locking groove 134, the locking indicators 100 still indicate that the collar 52 is unlocked. Specifically, the features 102 sit within indents 100 and the locking indicators extend above the outer surface 108 of the locking collar 52 as shown in FIG. 10B.

Locking collar 52 is rotated with enough force to slide the features 102 out of the indents 100 and allow the locking collar 52 to rotate. As the locking collar is rotated, the windows 76 are moved out of circumferential alignment with the fingers 70 and instead the solid sections 78 of the locking collar are positioned over respective fingers 70 as shown in FIG. 12. The locking collar is rotated until the locking indicators 100, and particularly the features 102 on the end of flexible tines 82 are aligned with the slots 112 formed in the finger collar 50. Specifically, referring to FIG. 3 the features 102 of the locking indicators will engage slots 112 proximate to the transition sections 114 that operate with the slots 112 to form the depressions 110 that receive the respective features 102 at the end of each of the tines 82. The depression 110 formed by the slot 112 and the respective transition sections 114 on either side of the slot make a depression that extends through the finger collar 50 and thus is deeper than the depth of the indents 100. This allows each of the tines 82 to flex completely back to the flush position where they are flush with the outer surface 108 of the locking collar 52 as shown in FIGS. 12A, 12B.

The connectors are now in the locked position and the fingers 70 are held into engagement with the locking groove 134 by the solid section 78 of the locking collar thus preventing the fingers from flexing radially outwardly. In that way, through the interaction of the finger ridges 74 and the locking groove 134 the finger collar 50 and the outer locking collar 52 are held in engagement with the pin portion 28 of assembly 12. This locks the assemblies together and prevents the plug portion from being unplugged or uncoupled from the socket portion. As shown in FIGS. 12A and 12B, locking indicators 80 now sit flush with the outer surface 108 of locking collar 52. The features 102 of the locking indicators 80 seat within the depressions 110 and are flush with the solid sections 78 of the locking collar that overlie the flexible fingers 70. In that way, the locking indicators 80 provide a visual and a tactile indication that the locking collar 52 is in the locked position and the two assemblies are locked together in their mated arrangement.

Figure 13:
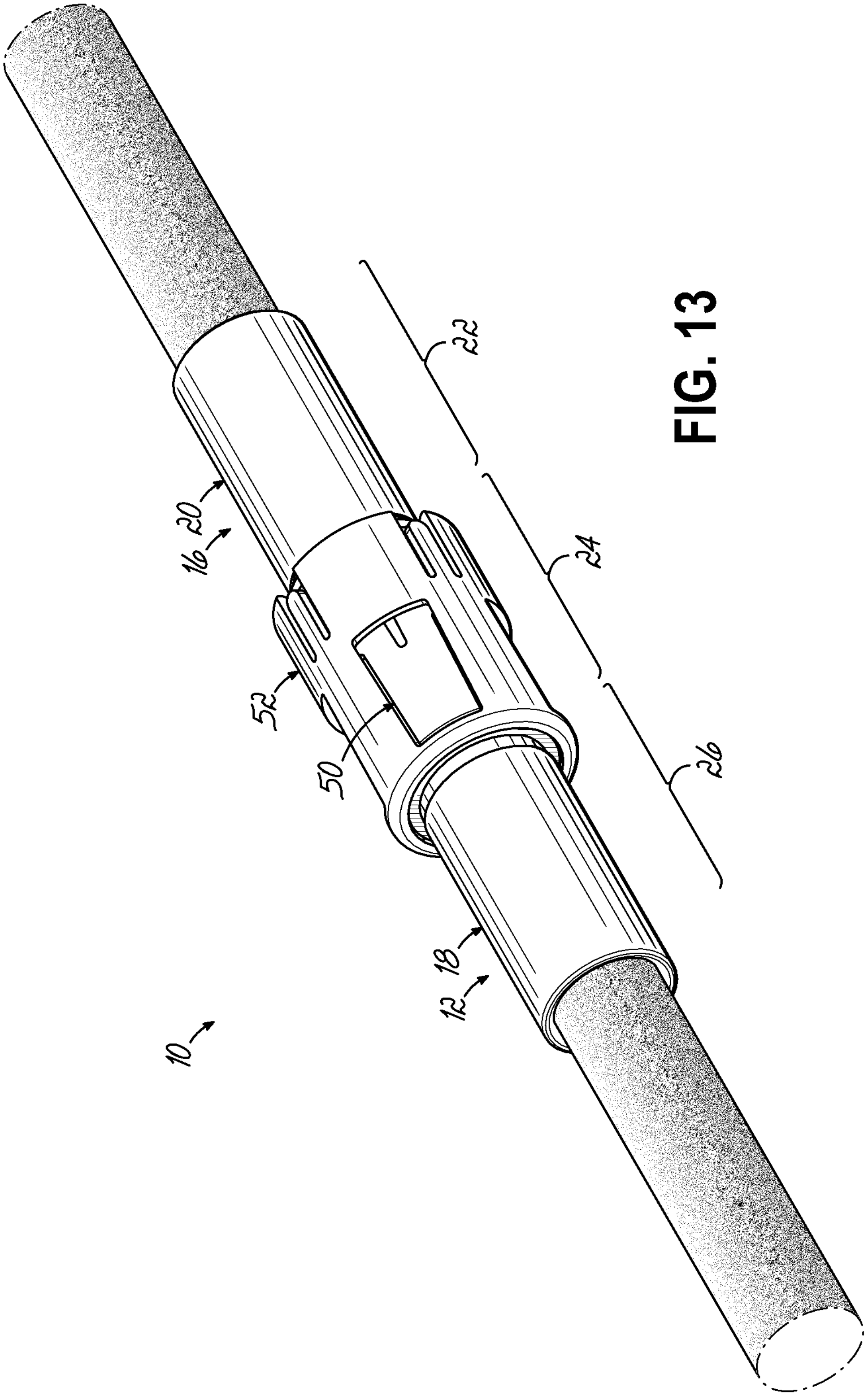
FIG. 13 is a front perspective view of an assembled cable using the connector assembly in accordance with an embodiment of the invention.

FIG. 13 illustrates a cable assembly formed in accordance with the invention using the assemblies 12, 16. A conductor is inserted into each of the assemblies, such as in the crimp portions 22, 26 and is secured, such as by appropriate crimping or some other suitable method as would be understood by a person of ordinary skill in the art. Two separate conductors or cables, each containing connector assembly 12 or 16, may be plugged together appropriately and then locked to create the electrical connection and a finished cable or spliced cable.

To unplug the pin assembly 12 from the socket assembly 16, the locking collar 52 may again be rotated with a force that will move the locking indicators out of the depressions 110. The collar 52 may then be rotated to align windows 76 with the flexible fingers 70 and align the locking indicators 80 with indents 100 thus raising the locking indicators back to their raised or unlocked position and again allowing the flexible fingers 70 to flex through the aligned and open windows 76. In that way, the pin assembly may be pulled out of the socket assembly to unmate the connector portion.

The assemblies may be mated and unmated selectively numerous times. No special tools are needed and the assemblies may be locked together with a twist of the locking collar and then unlocked with a similar twist of the locking collar, with indications of the locked and unlocked states being provided. The connector assembly of the invention provides a robust electrical connection and the ability to splice conductors and wires along their length without special tools, mounting methods, or mounting orientations. Because the flexible fingers 70 engage the circular locking groove 134 that extends around the circumference of the pin assembly portion, the two mated assemblies may be rotated with respect to each other as needed even when locked. Thus, the present invention provides significant advantages over prior art connectors and cable assemblies and particularly provides advantages for use within aircraft wiring schemes.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

What is claimed is:

1. An electrical connector comprising:

a pin assembly including a pin;

a socket assembly to mate with the pin assembly, the socket assembly including a socket body configured to receive the pin, a finger collar surrounding the socket body, and a locking collar rotatable on the finger collar between an unlocked position and a locked position;

the finger collar including at least one flexible finger that flexes to engage the pin assembly when it is mated with the socket assembly;

the locking collar including a window in alignment with the at least one flexible finger in the unlocked position so the flexible finger may flex through the locking collar to engage the pin assembly and including a solid section adjacent to the window; and the locking collar being rotatable to the locked position to move the window out of alignment with the at least one flexible finger and to move the solid section to overlie the at least one flexible finger to prevent flexing of the flexible finger and keep it in engagement with the pin assembly to lock the mated pin assembly and socket assembly together.

2. The electrical connector of claim 1 wherein the finger collar includes a plurality of flexible fingers that flex to engage the pin assembly around the pin assembly when it is mated with the socket assembly.

3. The electrical connector of claim 2 wherein the locking collar includes a plurality of windows configured for aligning with respective flexible fingers in the unlocked position so the flexible fingers may flex to engage the pin assembly.

4. The electrical connector of claim 1 wherein the locking collar includes at least one locking indicator thereon, the locking indicator configured for flexing radially outwardly from the locking collar when the locking collar is in the unlocked position and lying generally flush with the locking collar in the locked position.

5. The electrical connector of claim 4 further comprising at least one indent in a surface of the finger collar, the locking indicator engaging the indent for aligning a window of the locking collar and the at least one flexible finger in the unlocked position so the flexible finger may flex through the locking collar.

6. The electrical connector of claim 4 wherein the finger collar includes a depression for receiving the at least one locking indicator when the locking collar is in the locked position so it lies flush with the locking collar.

7. The electrical connector of claim 1 wherein the at least one flexible finger includes a ridge feature thereon and the pin assembly includes a groove therearound, the ridge feature dropping into the groove when the pin assembly and socket assembly are mated to secure the socket assembly with the pin assembly.

8. The electrical connector of claim 7 wherein the locking collar, in the locked position, keeps the flexible finger ridge feature in the groove to secure the socket assembly with the pin assembly.

9. The electrical connector of claim 1 further comprising a conductive insert positioned in the socket body, the conductive insert configured for receiving the pin when the pin assembly is mated with the socket assembly.

10. An electrical connector comprising:

a first assembly with a body;

a second assembly with a body configured to mate with the first assembly body, the second assembly including a finger collar surrounding the second assembly body, and a locking collar rotatable on the finger collar between an unlocked position and a locked position;

the finger collar including at least one flexible finger that flexes to engage the first assembly when it is mated with the second assembly;

the locking collar including a window in alignment with the at least one flexible finger in the unlocked position so the flexible finger may flex through the locking collar to engage the first assembly and including a solid section adjacent to the window;

the locking collar being rotatable to the locked position to move the window out of alignment with the at least one flexible finger and to move the solid section to overlie the at least one flexible finger to prevent flexing of the flexible finger and keep it in engagement with the first assembly to lock the mated first assembly and second assembly together.

11. The electrical connector of claim 10 wherein at least one of the first and second assemblies includes a pin portion and the other of the first and second assemblies includes a socket portion, the pin portion mating with the socket portion to mate the first and second assemblies.

12. The electrical connector of claim 11 wherein the finger collar and locking collar are positioned on the socket portion to engage a pin portion and lock the mated first assembly and second assembly together.

13. The electrical connector of claim 10 wherein the finger collar includes a plurality of flexible fingers that flex to engage the first assembly around the body of the first assembly when it is mated with the second assembly.

14. The electrical connector of claim 13 wherein the locking collar includes a plurality of windows configured for aligning with respective flexible fingers in the unlocked position so the flexible fingers may flex to engage the first assembly.

15. The electrical connector of claim 10 wherein the locking collar includes at least one locking indicator thereon, the locking indicator configured for flexing radially outwardly from the locking collar when the locking collar is in the unlocked position and lying generally flush with the locking collar in the locked position.

16. An electrical cable assembly comprising:

a first conductor and a first connector assembly having a body, the first connector assembly coupled with the first conductor;

a second conductor and a second connector assembly having a body, the second connector assembly coupled with the second conductor;

the second assembly body configured to mate with the first assembly body and including a finger collar surrounding the second assembly body, and a locking collar rotatable on the finger collar between an unlocked position and a locked position;

the finger collar including at least one flexible finger that flexes to engage the first assembly when it is mated with the second assembly;

the locking collar including a window in alignment with the at least one flexible finger in the unlocked position so the flexible finger may flex through the locking collar to engage the first assembly and including a solid section adjacent to the window;

the locking collar being rotatable to the locked position to move the window out of alignment with the at least one flexible finger and to move the solid section to overlie the at least one flexible finger to prevent flexing of the flexible finger and keep it in engagement with the first assembly to lock the mated first assembly and second assembly together to form the cable assembly.

17. The electrical cable assembly of claim 16 wherein at least one of the first and second assemblies includes a pin portion and the other of the first and second assemblies includes a socket portion, the pin portion mating with the socket portion to mate the first and second assemblies.

18. The electrical cable assembly of claim 17 wherein the finger collar and locking collar are positioned on the socket portion to engage a pin portion and lock the mated first assembly and second assembly together.

19. The electrical cable assembly of claim 16 wherein the finger collar includes a plurality of flexible fingers and the locking collar includes a plurality of windows configured for aligning with respective flexible fingers so the fingers may flex to engage the first assembly around the body of the first assembly when it is mated with the second assembly.

20. The electrical cable assembly of claim 16 wherein the locking collar includes at least one locking indicator thereon, the locking indicator configured for flexing radially outwardly from the locking collar when the locking collar is in the unlocked position and lying generally flush with the locking collar in the locked position.

* * * * *